US006679575B2

(12) United States Patent
Someno

(10) Patent No.: US 6,679,575 B2
(45) Date of Patent: Jan. 20, 2004

(54) MEDIUM STORING A PRINT DENSITY CORRECTION PROGRAM, APPARATUS AND METHOD FOR THE CORRECTION OF PRINT DENSITY, MEDIUM STORING A PRINT CONTROL PROGRAM, AND APPARATUS AND METHOD FOR PRINT CONTROL

(75) Inventor: Masahiro Someno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 10/102,855

(22) Filed: Mar. 22, 2002

(65) Prior Publication Data

US 2002/0140754 A1 Oct. 3, 2002

(30) Foreign Application Priority Data

Mar. 28, 2001 (JP) ............................ 2001-093942

(51) Int. Cl.[7] .............. B41J 2/205; B41J 2/21
(52) U.S. Cl. .......................... 347/15; 347/43
(58) Field of Search ............ 347/15, 43, 251, 347/252; 358/1.9, 296; 382/162

(56) References Cited

U.S. PATENT DOCUMENTS 6,078,410 A  *  6/2000  Adachi ................. 358/522
6,519,054 B1 *  2/2003  Ikeda et al. ............ 358/1.9

FOREIGN PATENT DOCUMENTS

JP      3-5148       1/1991
JP      8-118647     5/1996

* cited by examiner

Primary Examiner—Thinh Nguyen
(74) Attorney, Agent, or Firm—Mattingly, Stanger & Malur, P.C.

(57) ABSTRACT

In conventional ink jet printers there has been a problem such that with a decrease in residual quantity of ink, the density of the ink becomes lower and so does the print density. In a color conversion processing which a color conversion module 10c1 executes in a printing data generating process executed by a printer driver 10c, an amount of ink used is acquired with respect to ink contained in each of ink cartridges 32 and 33 and the degree of variations in ink density is acquired on the basis of the amount of ink used. Then, on the basis of the degree of variations in ink density, a correction coefficient table TBL is retrieved to acquire a correction coefficient associated with print density.

24 Claims, 14 Drawing Sheets

MEDIUM STORING A PRINT DENSITY CORRECTION PROGRAM, APPARATUS AND METHOD FOR THE CORRECTION OF PRINT DENSITY, MEDIUM STORING A PRINT CONTROL PROGRAM, AND APPARATUS AND METHOD FOR PRINT CONTROL

BACKGROUND OF THE INVENTION

1. Field of the Invention

The present invention relates to a medium storing a print density correction program which corrects the print density on the basis of variations in ink density, an apparatus and method for the correction of print density, a medium which stores a print control program, and an apparatus and method for print control.

2. Description of the Prior Art

In a conventional ink jet printer which makes printing by ejecting ink onto a recording medium such as paper, the amount of ink is kept constant when printing is made at a predetermined print density irrespective of a residual amount of ink.

In the above conventional ink jet printer, particularly when using a pigment-based ink, the print density changes with time, depending on a residual amount of ink, with consequent variations in ink density. That is, the ink density is low in an upper layer within an ink cartridge filled with ink and becomes higher gradually toward a lower layer. In printing, ink is used successively from the lower layer of a high ink density. Therefore, as the amount of ink becomes small, the ink density becomes low and so does the print density gradually.

SUMMARY OF THE INVENTION

The present invention has been accomplished in view of the above-mentioned problem and it is an object of the invention to provide a medium storing a print density correction program which corrects the print density on the basis of variations with time in ink density to permit printing at a constant print density, an apparatus and method for the correction of print density, a medium which stores a print control program, and an apparatus and method for print control.

In the medium which stores a print density correcting program according to the present invention, the program causes a computer to correct variations in print density based on variations in ink density and corresponding to changes with time in ink density in a printer which makes printing by ejecting ink onto a printing medium. In accordance with the print density correcting program the computer is allowed to execute an identification information acquiring function of acquiring identification information which permits the degree of variations in ink density to be identified directly or indirectly, as well as a print density correcting function comprising acquiring a correction coefficient for correcting variations in print density corresponding to changes with time in ink density and correcting the print density so as to eliminate the variations in print density in accordance with the acquired correction coefficient.

In the present invention thus constructed, the computer executes the identification information acquiring function, that is, acquires identification information which permits the degree of variations in ink density to be identified directly or indirectly in a printer, the printer ejecting ink onto a printing medium to effect printing, then the computer executes the print density correcting function, that is, acquires a correction coefficient for correcting the variations in print density corresponding to the changes with time in ink density in accordance with the identification information acquired, and thereafter corrects the print density so as to eliminate the variations in print density on the basis of the correction coefficient thus acquired.

Usually, when printing is performed on the basis of a predetermined print density, there is made control so that a predetermined amount of ink which can realize the said print density is ejected onto a printing medium. However, if there are variations in the density of the ink ejected, even if the ink is ejected in the predetermined amount onto the printing medium, there will occur variations in the actual print density which is expressed by the said amount of ink. In the present invention, when printing is performed, the print density is corrected while taking such variations in ink density into account so that the actual print density becomes a desired print density.

Therefore, according to the present invention it is possible to provide a medium storing a print density correcting program which corrects the print density on the basis of variations in ink density, thereby permitting printing to be carried out at a certain constant print density even with the lapse of time.

In executing the identification information acquiring function, that is, when acquiring identification information which permits the degree of variations in ink density to be identified, a state of ink may be acquired directly and used as the identification information, or there may be acquired identification information which can identify the degree of variations in ink density indirectly. In executing the identification information acquiring function, the timing for acquiring the same information is not specially limited. The identification information may be acquired when printing is started, or it may be acquired during printing. The print density correcting function may be carried out so as to correct the print density in accordance with the identification information thus acquired.

As to the identification information acquired by the identification information acquiring function, no special limitation is placed on whether it is to be acquired directly or indirectly insofar as it can identify the degree of variations in ink density as noted above.

As an example of identification information able to identify the degree of variations in ink density, there may be adopted a construction wherein information on the amount of ink used is acquired as the identification information in the identification information acquiring function and a correction coefficient based on a correlation between the information on the amount of ink used and information on changes in print density is acquired in the print density correcting function.

According to this construction, information on the amount of ink used is acquired as the identification information by the identification information acquiring function, so in the print density correcting function there is acquired a correction coefficient based on a correlation between the information on the amount of ink used and information on changes in print density. The information on the amount of ink used, which is acquired by the identification information acquiring function, may be one managed by a printer connected to an apparatus which implements the same function or may be one managed by a print controller which controls the printer. It may be changed as necessary. As to the amount of ink used, an actual amount of ink used may be measured and used as the information on the amount of ink used, or a residual amount of ink may be measured to determine the amount of ink used indirectly and the amount of ink thus determined may be used as the information on the amount of ink used, or the amount of ink used may be determined on the basis of the number of printed sheets and used as the information on the amount of ink used. Thus, a change maybe made as necessary. The degree of variations in ink density depends on changes with time after charging the ink into an ink cartridge or the like, so by utilizing the information on the amount of ink used it becomes possible to identify such changes with time, i.e., the degree of variations in ink density.

This permits the correction of the print density in accordance with the information on the amount of ink used.

As noted above, the degree of variations in ink density depends on changes with time after the ink has been charged into an ink cartridge or the like. As another example of identification information able to identify the degree of variations in ink density based on such changes with time in ink density, there may be adopted a construction wherein information on the manufacture of ink is acquired as the identification information in the identification information acquiring function, while in the print density correcting function there is acquired a correction coefficient based on a correlation between elapsed time after the manufacture of ink based on the said information on manufacture and information on changes in print density.

In the above construction, information on the manufacture of ink is acquired as identification information by the identification information acquiring function, so in the print density correcting function there is acquired a correction coefficient based on a correlation between elapsed time after the manufacture of ink based on the said information on manufacture and information on changes in print density. The information on the manufacture of ink specifies when ink was manufactured in a state employable for printing such as a filled state into an ink cartridge or the like. It may be the date or time of manufacture. The information on the manufacture of ink may be recorded on an ink cartridge or the like simultaneously with the manufacture of ink in such a manner that it can be read from the exterior by the identification information acquiring function.

This permits the correction of the print density in accordance with the information on the manufacture of ink.

Needless to say, both may be combined together. In this case, in the identification information function there is acquired as the identification information both information on the amount of ink used and information on the manufacture of ink, while in the print density correcting function there is acquired a correction coefficient which reflects information on changes in print density based on both information on the amount of ink used and information on the manufacture of ink.

It is as noted above that changes with time in ink density can be recognized from both information on the amount of ink used and information on the manufacture of ink. In some case, after ink being filled into an ink cartridge or the like until actual use thereof the ink is managed so as to prevent the occurrence of variations in ink density. In such a case, it is preferable if changes with time in ink density can be identified after the ink has become actually employable in printing. In this connection there may be adopted a construction wherein in the identification information acquiring function there is acquired information on the replacement of ink as the identification information, while in the print density correcting function there is acquired a correction coefficient based on a correlation between changes with time in ink density based on the ink replacement information and changes in print density.

In this construction, information on the replacement of ink is acquired by the identification information acquiring function, so in the print density correcting function there is acquired a correction coefficient based on a correlation between changes with time in ink density based on the ink replacement information and changes in print density. The ink replacement information specifies when ink was filled into an ink cartridge or the like and became employable for printing with the cartridge loaded into a printer. It may be the date or time of ink replacement. It is optional whether the ink replacement information is to be managed on the printer side and is read by the identification information acquiring function or is managed on a print controller side and is read by the identification information acquiring function.

This permits the correction of the ink density on the basis of ink replacement information.

As an example of construction wherein the print density is corrected by the print density correcting function on the basis of the identification information acquired by the identification information acquiring function, there may be adopted a construction wherein in the print density correcting function the print density is corrected in the course of conversion to color data of a color space different from color data of a predetermined color space in print control.

For example, color data on a computer often utilizes RGB space as a color space, while in a printer or the like CMY space is often utilized. Therefore, color data is converted from RGB data to CMY (or CMYK) data. Print density is corrected in the course of this conversion.

In this case, as a more concrete construction there may be adopted a construction wherein in the print density correcting function data in a color conversion table, which is referred to in the course of the above conversion to color data, are rewritten to correct the print density.

According to this construction, by rewriting data in the color conversion table on the basis of the identification information acquired, the print density is corrected by mere reference to the color conversion table even without repeating the correction of print density for each individual case. The color conversion table is a data table for converting predetermined element colors which represent constituent picture elements of an image into deep/thin element colors.

As described above, the predetermined element colors which represent the constituent picture elements of an image are converted to deep/thin element colors by the color conversion table. Since printing is performed on the basis of the thus-converted deep/thin element colors, the print density can be corrected by rewriting the data of the color conversion table in accordance with the identification information. The timing for modifying the color conversion table is not specially limited, but may be based on the timing at which the identification information is acquired. Therefore, if identification information is acquired at the start of printing, the color conversion table may be modified when printing is started, and at every acquisition of identification information during printing the color conversion table may be modified accordingly.

As another concrete construction for correcting the print density in the course of color data conversion there may be adopted a construction wherein in the print density correcting function the color data after the color space conversion is converted to correct the print density.

In this construction, after color conversion made by using the color conversion table or the like, the print density based on the color data after the conversion is corrected for example in a state of CMY data.

For example, a conversion table in which input and output data are correlated with each other for each color may be constructed and the conversion of data may be performed by reference to the conversion table.

In the identification information acquiring function, identification information is acquired on the basis of a predetermined appropriate timing. This timing is not specially limited, but may be changed as necessary. As an example of the identification information acquiring timing in the identification information acquiring function there may be adopted a construction wherein in the identification information acquiring function the identification information is acquired at every printing of a predetermined area of an image, while in the print density correcting function the print density is corrected as necessary upon acquisition of the identification information.

According to this construction, identification information is acquired by the identification information acquiring function at a timing of printing a predetermined area of an image, then in the print density correcting function the print density is corrected as necessary at the acquired timing of the identification information.

This permits the correction of the print density for each predetermined area to be printed.

Thus, it suffices for the identification information acquiring function to acquire identification information at a timing at which the printing of a predetermined area is carried out. The predetermined area can be changed as necessary. As an example of the predetermined area there may be adopted a construction wherein in the identification information acquiring function the identification information is acquired for each printing band width, while in the print density correcting function the print density is corrected for each band width upon acquisition of the identification information.

According to this construction, identification information is acquired by the identification information acquiring function for each band width as a unit of print execution, then in the print density correcting function the print density is corrected for each band width on the basis of the identification information thus acquired. In printing, an image is divided into plural band widths and printing data are produced for each of the band widths.

Therefore, if the correction of print density is performed for each band width, it becomes possible to effect the correction of print density synchronously with printing process. Thus, it becomes possible to prevent the exertion of influence on the printing speed even while making the correction of print density plural times in printing a single image.

As another example of the predetermined area there may be adopted a construction wherein in the identification information acquiring function the identification information is acquired for each picture element to be printed, while in the print density correcting function the print density is corrected for each picture element upon acquisition of the identification information.

According to this construction, identification information is acquired by the identification information acquiring function at a timing at which each picture element is printed. In the print density correcting function, the print density is corrected for each picture element at a timing at which the identification information is acquired. By thus acquiring identification information for each picture element it becomes possible to correct the print density in real time against the degree of variations in ink density which varies with the lapse of time. Particularly, in large-sized printing, there is a large timing lag from the printing of an initial picture element until printing of a last picture element. Therefore, if the print density is corrected for each picture element, the print density can be made uniform without being influenced by variations in ink density which occur during the period between the start of printing and the end of printing.

This permits the correction of the print density in real time against the degree of variations in ink density which varies with the lapse of time.

In printing, plural inks are usually employed. Therefore, if identification information is acquired for all of the inks and if the print density is corrected on the basis of the identification information thus acquired, the processing speed in the whole of printing process may be decreased. In view of this point there may be adopted a construction wherein in the print density correcting function the correction of print density is not performed for a predetermined element color.

According to this construction, since the correction of print density is not performed for a predetermined element color in the print density correcting function, it is not required to acquire identification information on the element color not to be corrected. By thus omitting the correction of print density for a predetermined element color it becomes possible to improve the processing speed in printing process.

As an example of such omission of the element color correction, the correction of print density may be omitted for yellow color.

As an example of a basic condition in the selection of ink for which the correction of print density is not performed, there may be adopted a construction wherein in the print density correcting function the correction of print density is not performed for a relatively thin element color out of plural element colors.

Thus, as to ink which is utilized for printing a relatively thin element color, variations in ink density are connived and the correction of print density is not performed, whereby it becomes possible to increase the processing speed in printing process.

More particularly, as to ink which is utilized for printing a thin element color, even if there occur a certain degree of variations in ink density with consequent occurrence of variations in print density, it is difficult for a human to visually confirm such variations in print density on a thus-printed matter. Besides, a printed matter is usually composed of plural element colors, so in the case of a relatively thin color, variations in print density become less conspicuous in comparison with the other colors. For this reason, as to the ink which is utilized for printing a relatively thin element color, variations in ink density are connived and the correction of print density is not performed, whereby it becomes possible to effect the printing process at a high speed.

As another example of a basic condition in the selection of ink not to be corrected for print density, there may be adopted a construction wherein in the print density correcting function the correction of print density is not performed for an element color of relatively small variations in ink density.

According to this construction, the correction of print density is not made for an element color of relatively small variations in ink density. The degree of variations in ink density differs for each ink color. Therefore, the correction of ink density is performed for an ink which is likely to cause a large degree of variations in ink density, while the correction of ink density is not performed for an ink which is difficult to cause variations in ink density and which is small in the degree of the variations.

Thus, as to an element color small in the degree of variations in ink density, the correction of print density is not conducted, whereby it becomes possible to speed up the printing process.

A printed matter usually comprises plural element colors, and in the case of an element color relatively small in the degree of variations in ink density, variations in print density are less conspicuous in comparison with the other element colors. Therefore, as to an ink which is utilized for an element color relatively small in the degree of variations in ink density, the variations in ink density are connived and the correction of print density is not performed, whereby the printing process can be carried out at a high speed.

As an example of ink which can cause variations in ink density there is mentioned an aqueous pigment ink.

Such an aqueous pigment is insoluble in water and it is necessary to prepare an ink in the form an aqueous dispersion with pigment particles dispersed in water. In such a pigment ink as an aqueous dispersion, the pigment particles contained in the dispersion precipitate with the lapse of time and there occurs a gradient in the concentration of pigment particles contained in the ink dispersion. That is, variations in ink density occur.

Thus, it is more preferable to apply the present invention to ink constituted by an aqueous pigment having such a characteristic.

Consequently, it is possible to correct variations in print density caused by variations in ink density and present a preferred example of ink.

The print density correcting program described above may be executed alone, but may also be implemented as one function of a printer driver for print control. More specifically, according to the present invention there is provided a medium with a print density correcting program stored thereon, the program being adapted to operate on a computer to correct variations in print density in a printer based on variations in ink density which correspond to changes with time in ink density, the computer capable of being connected to the printer which makes printing by ejecting ink onto a printing medium and being provided with an interface which can transmit data. In accordance with the print density correcting program, an identification information acquiring function of acquiring identification information which permits the degree of variations in ink density to be identified directly or indirectly, and a print density correcting function comprising acquiring a correction coefficient and correcting the print density so as to eliminate the variations in print density in accordance with the correction coefficient acquired, the correction coefficient being for correcting variations in print density corresponding to changes with time in ink density in accordance with the identification information acquired, are executed by the computer.

In this sense the printer driver itself may be applied. In this case, according to the present invention there is provided a medium with a print control program stored thereon, the program being adapted to operate on a computer to input image data of a color space different from a color space of printing data capable of being printed in a printer and convert the image data into printing data which the printer can print and then output the thus-converted printing data, the computer capable of being connected to the printer which makes printing by ejecting ink onto a printing medium and being provided with an interface which can transmit data. In accordance with the print control program, a conversion function of converting the image data into the printing data, an identification information acquiring function of acquiring identification information which permits the degree of variations in ink density to be identified directly or indirectly, thereby correcting variations in print density based on the variations in ink density which correspond to changes with time in ink density, and a print density correcting function comprising acquiring a correction coefficient for correcting variations in print density corresponding to the changes with time in ink density in accordance with the acquired identification information, correcting the print density so as to eliminate the variations in print density on the basis of the correction coefficient acquired, and causing the thus-corrected print density to be reflected in the print data, are executed by the computer.

The recording medium described above may be a magnetic recording medium or a magneto-optic recording medium or any of recording mediums which will be developed in future.

Complete equivalence is applied to duplicating stages, including primary and secondary duplicates. Even in a combined configuration implemented by a partial software configuration and a partial hardware configuration, the idea of the present invention is applied thereto without any difference. There may be adopted a mode in which the program is partially stored on the recording medium and is read as necessary.

It goes without saying that the medium with such a print density correcting program stored thereon can alone be an object of business and also can be an object of business as a substantial apparatus constituted by means which can execute the functions implemented by the medium with the print density correcting program stored thereon. Thus, the medium with the print density correcting program stored thereon can be substantiated into a print density correcting apparatus which exhibits the same effect as above.

In this way it is possible to provide a print density correcting apparatus which corrects the print density on the basis of variations in ink density and which thereby can effect printing at a constant print density even with the lapse of time.

Further, it should be readily clear that the technique for correcting variations in print density based on variations in ink density is not always limited to a substantial print density correcting apparatus, but that even a method thereof can fulfill the function to a satisfactory extent. That is, according to the present invention it is also possible to provide a method for implementing the above print density correcting apparatus. Thus, a limitation is not always made to the substantial print density correcting apparatus, but even the adoption of a print density correcting method is also effective equally.

In this way it is possible to provide a print density correcting method which corrects the print density on the basis of variations in ink density and which thereby permits printing to be done at a constant print density even with the lapse of time.

The invention also resides in printing data itself having such a corrected print density. More specifically, such printing data is not specially limited insofar as it is a binarized printing data for which variations in print density in a printer based on variations in ink density corresponding to changes with time in ink density have been corrected, the printer ejecting ink onto a printing medium to effect printing, and for which the print density has been corrected so as to eliminate variations in print density with use of a correction coefficient based on identification information, the identification information permitting the degree of variations in ink density to be identified directly or indirectly.

When viewed from another viewpoint, there is provided, according to the present invention, a medium with a print density correcting program stored thereon, the program functioning to correct variations in pint density based on variations in ink density. In accordance with this print density correcting program, an identification information acquiring function of acquiring identification information able to identify the degree of variations in ink density and a print density correcting function of correcting variations in print density in accordance with the acquired identification information are executed by means of a computer.

According to this construction there is provided a medium with a print density correcting program stored thereon, the program functioning to correct variations in print density based on variations in ink density and capable of being executed by a computer. In this case, the medium with the print density correcting program stored thereon is constructed so as to possess both identification information acquiring function and print density correcting function. In the former function there is acquired identification information which can identify the degree of variations in ink density, while in the latter function variations in print density are corrected in accordance with the identification information acquired.

Needless to say, the invention based on such a viewpoint may be a substantial apparatus or method.

DESCRIPTION OF THE PREFERRED EMBODIMENTS

Figure 1:
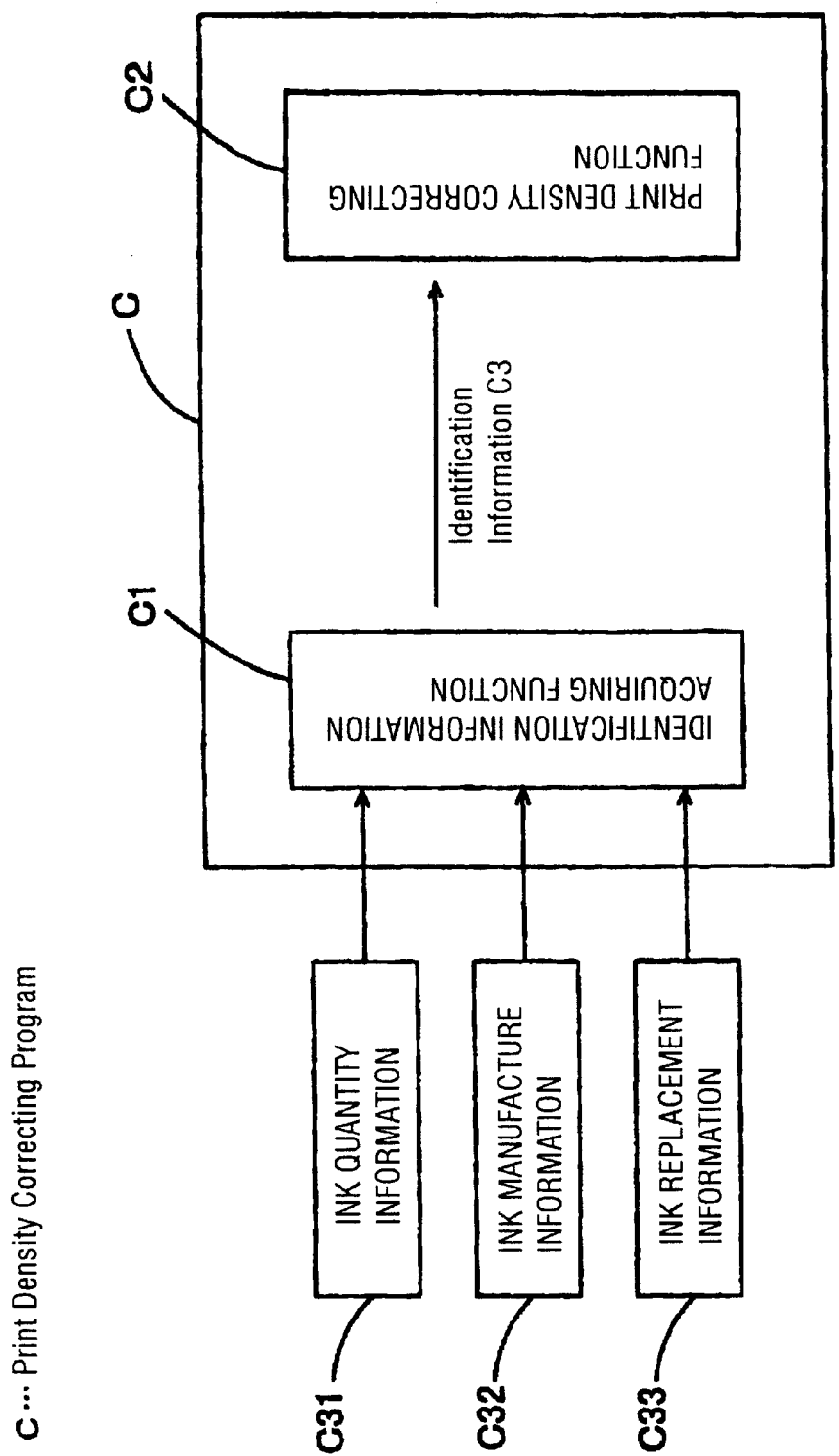
FIG. 1 is a conceptual diagram showing a technical concept of the present invention.

Embodiments of the present invention will be described below in accordance with the following sequence:
(1) Summary of the invention
(2) Construction of a printing system
(3) Construction of a computer software
(4) Construction of a printer
(5) Printing data generating process
(6) First embodiment
(7) Second embodiment
(8) Modified example of identification information
(9) Thin color
(10) Pigment With reference to the accompanying drawings, the following description is now provided about embodiments of the present invention.
(1) Summary of the Invention FIGS. 1 to 3 are conceptual diagrams showing technical concepts of the present invention.

Figure 2:
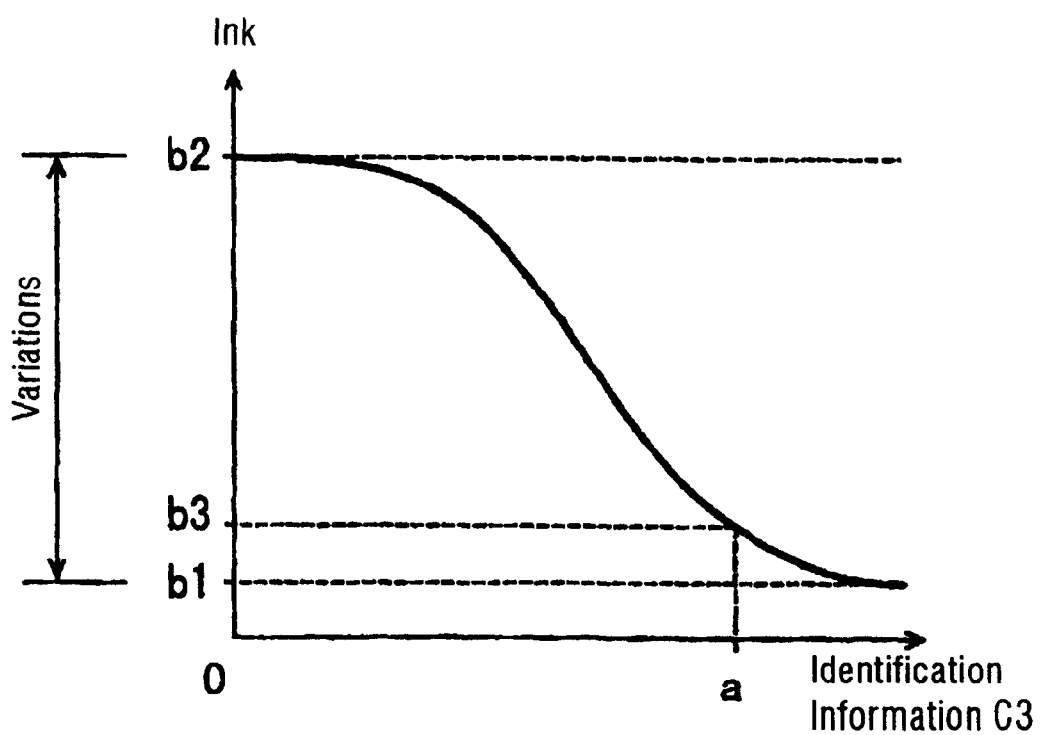
FIG. 2 is a conceptual diagram showing a technical concept of the present invention.

FIG. 1 illustrates the construction of a print density correcting program. In the same figure, a print density correcting program C has an identification information acquiring function C1 and a print density correcting function C2. In this construction, variations in print density caused by variations in ink density are corrected in accordance with identification information which can identify the degree of variations in ink density, thereby permitting printing to be carried out at a constant print density independently of variations in ink density. The identification information acquiring function C1 acquires ink quantity formation C31, ink manufacture information C32, and ink replacement information C33, as identification information C3. The ink density correcting function C2 inputs the identification information C3 acquired by the identification information acquiring function C1. The identification information C3 can identify the degree of variations in ink density. In FIG. 2 there is shown a relation between the identification information C3 and variations in ink density. In the same figure it is seen that variations in ink density occur in the range of b1 to b2 on the basis of a function which is expressed in terms of a predetermined curve and that in the case where the identification information C3 acquired by the identification information acquiring function C1 is identification information, a, variations in ink density correspond to the degree of variations, b3.

Figure 3:
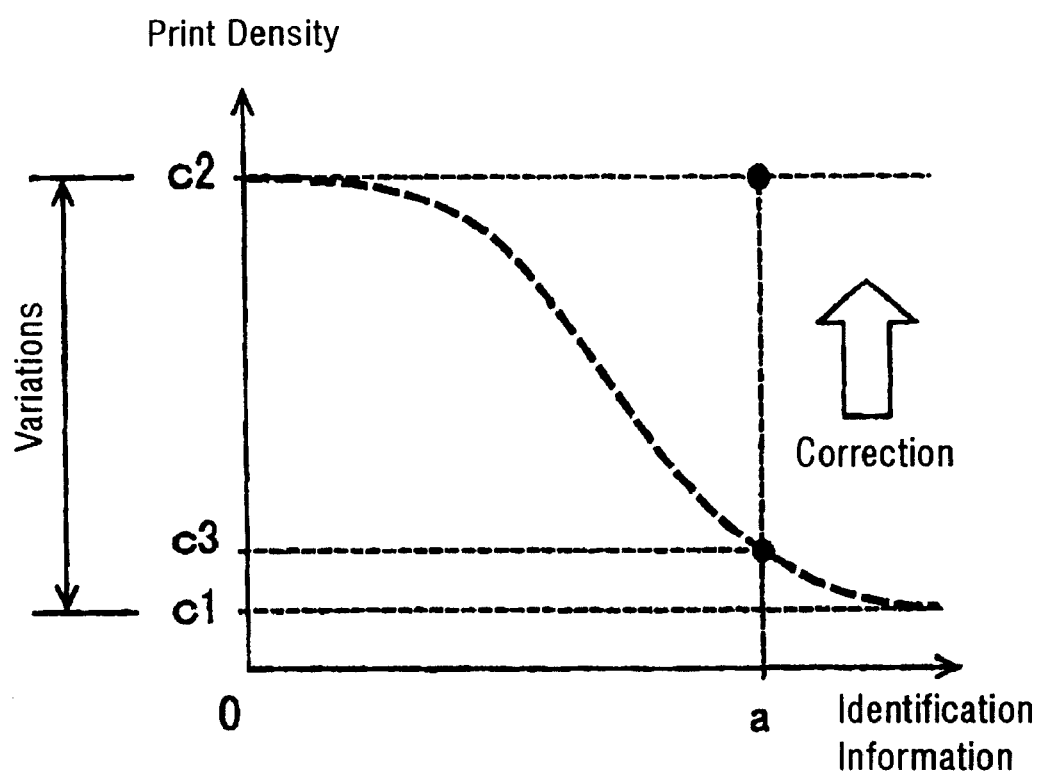
FIG. 3 is a conceptual diagram showing a technical concept of the present invention.

FIG. 3 shows a relation between identification information C3 and variations in print density.

In the same figure it is seen that when printing is made according to variations ink density, b1 to b2, the print density varies between c1 and c2. Thus, when printing is done at a predetermined density of the ink used, the print density must be c2, but the print density varies in the range of c1 to c3 due to variations in ink density. For example, in the case of identification information a, the print density becomes c3 correspondingly to the degree of variations b3 in ink density. Therefore, the print density correcting function recognizes this degree of variations in ink density beforehand and corrects the print density in accordance with the identification information C3. In this case, when the identification information is a, the print density is corrected from c3 to c2 so that printing can be done at a predetermined print density.

(2) Construction of a Printing System

Figure 4:
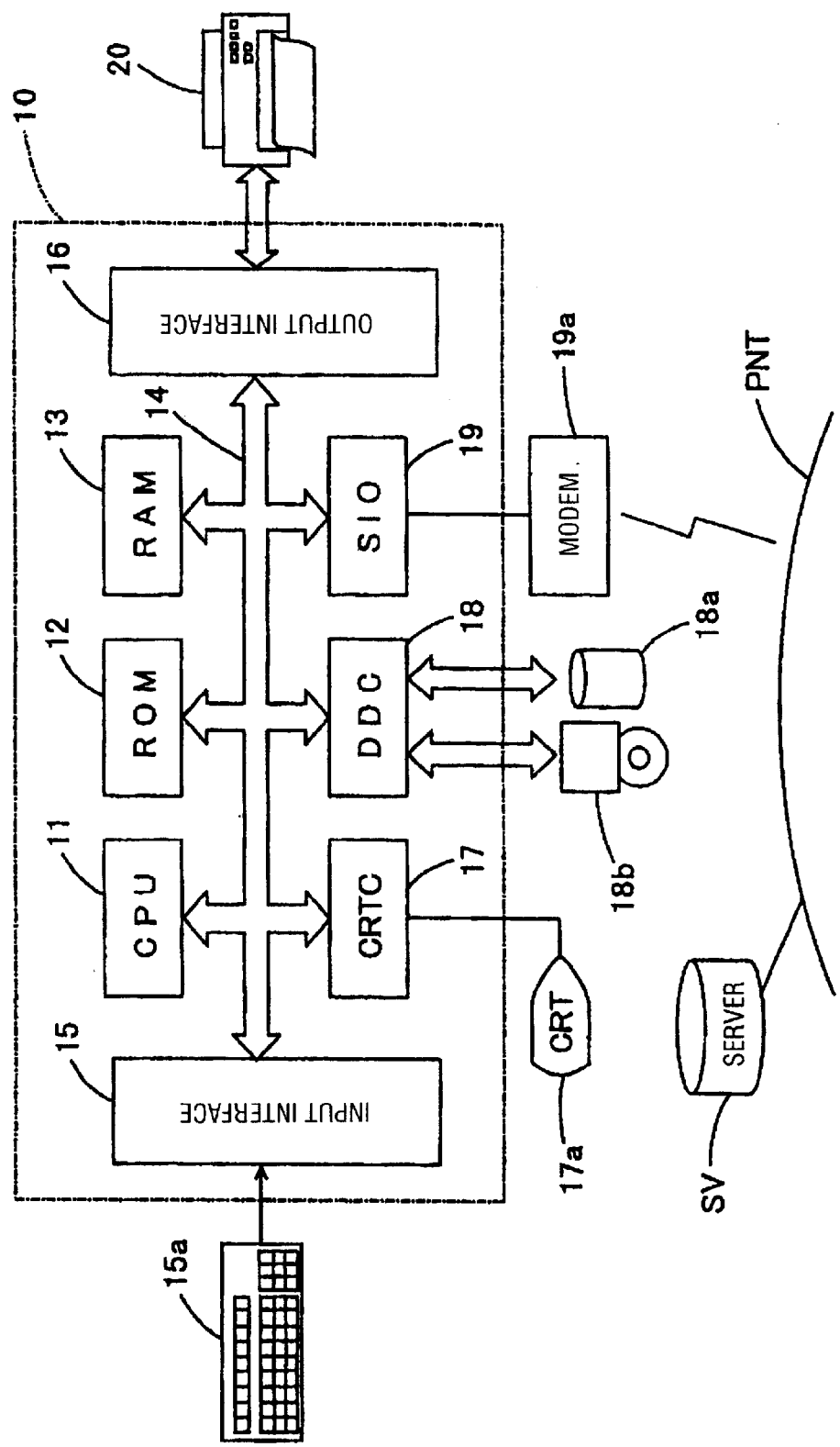
FIG. 4 is a block diagram showing the construction of a print density correcting apparatus and a printer.

FIG. 4 is a block diagram showing the construction of a print density correcting apparatus on which the print density correcting program described above is executed, as well as the construction of a printer which carries out printing at the corrected print density.

In the same figure, a color printer 20 as the printer is connected to a computer 10 as the print density correcting apparatus. The computer 10 not only functions as the print density correcting apparatus in which predetermined programs are loaded and executed, but also functions to control printing for the color printer 20. The computer 10 is provided with the following components interconnected through a bus 14, including CPU 11, ROM 12, and RAM 13 which execute various arithmetic operations in accordance with predetermined programs.

An input interface 15 inputs signals from a keyboard 15a, etc., while an output interface 16 outputs actual printing data to the color printer 20. A CRT controller 17 controls the output of signals to a CRT 17a capable of making a color display. A disk controller 18 controls the delivery and receipt of data between it and a hard disk 18a and a CD-ROM drive 18b or a flexible disk drive (not shown). In the hard disk 18a are stored various programs which are loaded and executed in the RAM 13 and various programs which are provided in the form of device drivers.

Further, a serial I/O interface 19 is connected to the bus 14. The serial I/O interface 19 is connected to a modem 19a and is further connected through the modem 19a to a public telephone line PNT. Through the serial I/O interface 19 and modem 19a the computer 10 is connected to an external network. By connection to a specific server SV it is also possible to download various programs to the hard disk 18a. Further, it is possible to load a required program through a flexible disk FD or CD-ROM and let the computer 10 execute it.

In this embodiment, an ink jet printer is used as the color printer 20 connected to the computer 10. Although a detailed construction will be described later, an image is printed by horizontal scanning in which a head provided with plural nozzles for the ejection of ink is reciprocated in one direction of printing paper and vertical scanning in which the head and the printing paper are moved relatively in a direction perpendicular to the horizontal scanning direction.

(3) Construction of a Computer Software

Figure 5:
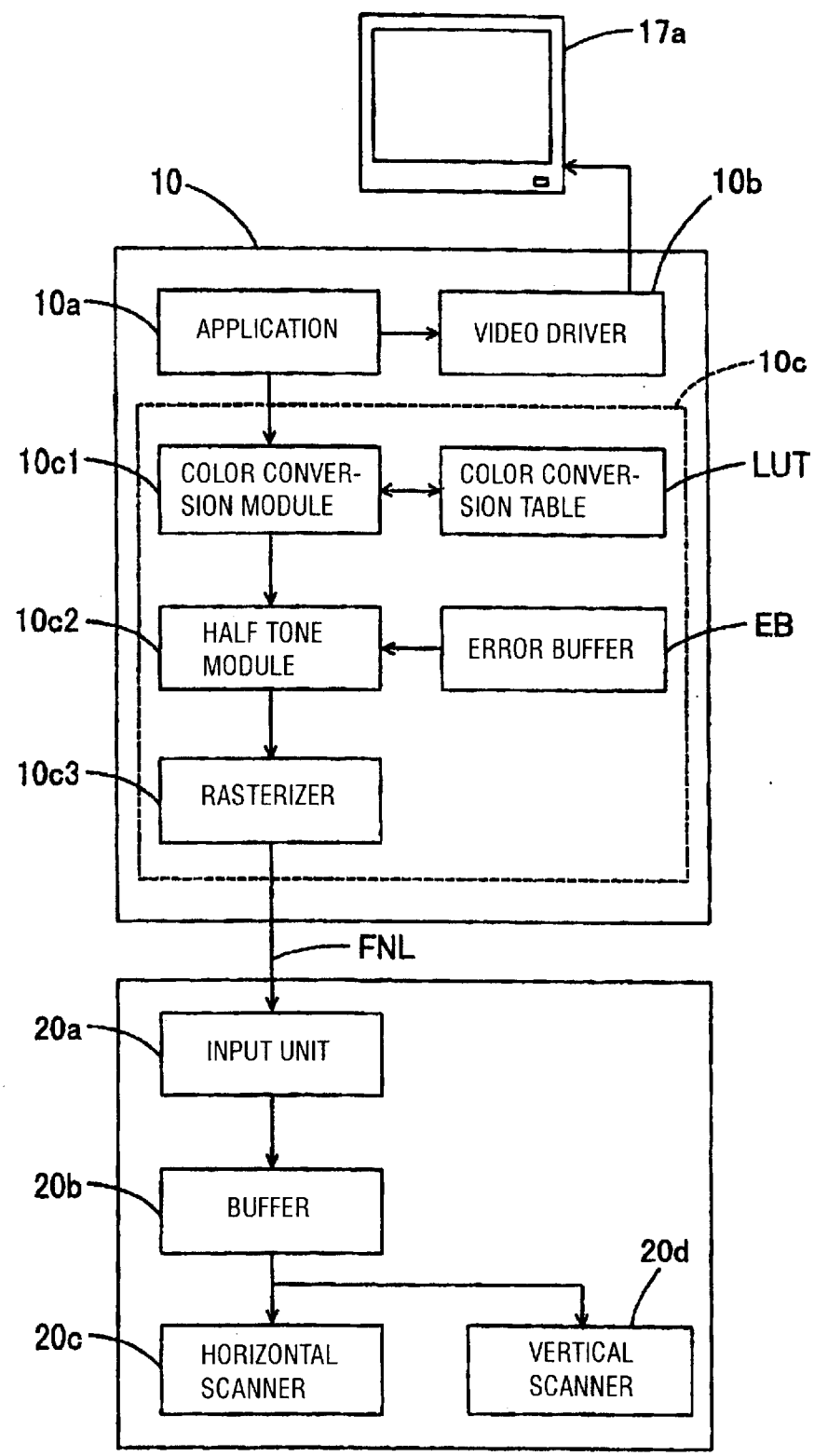
FIG. 5 is a block diagram showing the construction of software.

FIG. 5 is a block diagram showing the construction of a software which is stored on the hard disk 18a of the computer 10.

In the computer 10 shown in the same figure, an application program 10a operates under a predetermined operating system. A video driver 10b and a printer driver 10c are built in the operating system and printing data FNL to be transferred to the color printer 20 is outputted through these drivers from the application program 10a.

In accordance with an instruction provided from the keyboard 15a or from another component the application program 10a generates an image to be printed on a printing medium and displays the image on the CRT 17a through the video driver 10b. Image data ORG produced by the application program 10a is represented in terms of 256 gray scales (0 to 255) of three color components—red (R), green (G), and blue (B)—.

When the application program 10a issues a print instruction, the printer driver 10c in the computer 10 receives the image data ORG from the application program 10a. If the image data ORG generated by the application program 10a constitutes plural pages, the application program 10a transfers the image data ORG to the printer driver 10c successively while dividing it into a predetermined number of pages in accordance with a limitation on the operating system.

A description will now be given about an internal construction of the printer driver 10c. The printer driver 10c is provided with a color conversion module 10c1, a half tone module 10c2, and a rasterizer 10c3. In accordance with a color conversion table LUT provided in advance the color conversion module 10c1 corrects the color components of the image data ORG from 256 gray scales of R, G, B into 256 gray scales of color components (here cyan (C), magenta (M), yellow (Y), and black (K)) capable of being expressed by the color printer 20. Since the color printer 20 used in this embodiment is an ink jet printer as noted earlier, each picture element, or pixel, takes a binary, dot on/off value. Therefore, the half tone module 10c2 sets on or off of dot for each picture element in accordance with an error diffusion method so as to express a gradation value of the image data ORG which is corrected on the basis of a distribution of dots formed by the color printer 20.

The error diffusion method is a method in which a density error resulting from on/off of dot for each picture element is diffused to surrounding unprocessed picture elements to realize a half tone processing with little density error as a whole. According to this method, the half tone module 10c2 executes the said half tone processing while storing an error from each picture element into an error buffer EB. Next, in conformity with the horizontal scanning direction of the head the rasterizer 10c3 re-arranges printing data of rasters in the order of output to the head. Then, the printer driver 10c outputs the image data ORG thus processed to the color printer 20 as printing data FNL.

In the color printer 20, an input unit 20a receives the printing data FNL outputted from the computer 10 and stores it in a buffer 20b temporarily. The data in the buffer 20b is outputted to a horizontal scanner 20c, which in turn ejects ink in accordance with the printing data while allowing the head to perform a horizontal scan. When rasters are formed by the horizontal scanner 20c, a vertical scanner 20d conveys printing paper at a vertical scan quantity specified by the printer driver 10c. While the horizontal and vertical scanners 20c, 20d execute printing, the input unit 20a inputs data of the remaining portion successively.

(4) Construction of the Printer

Figure 6:
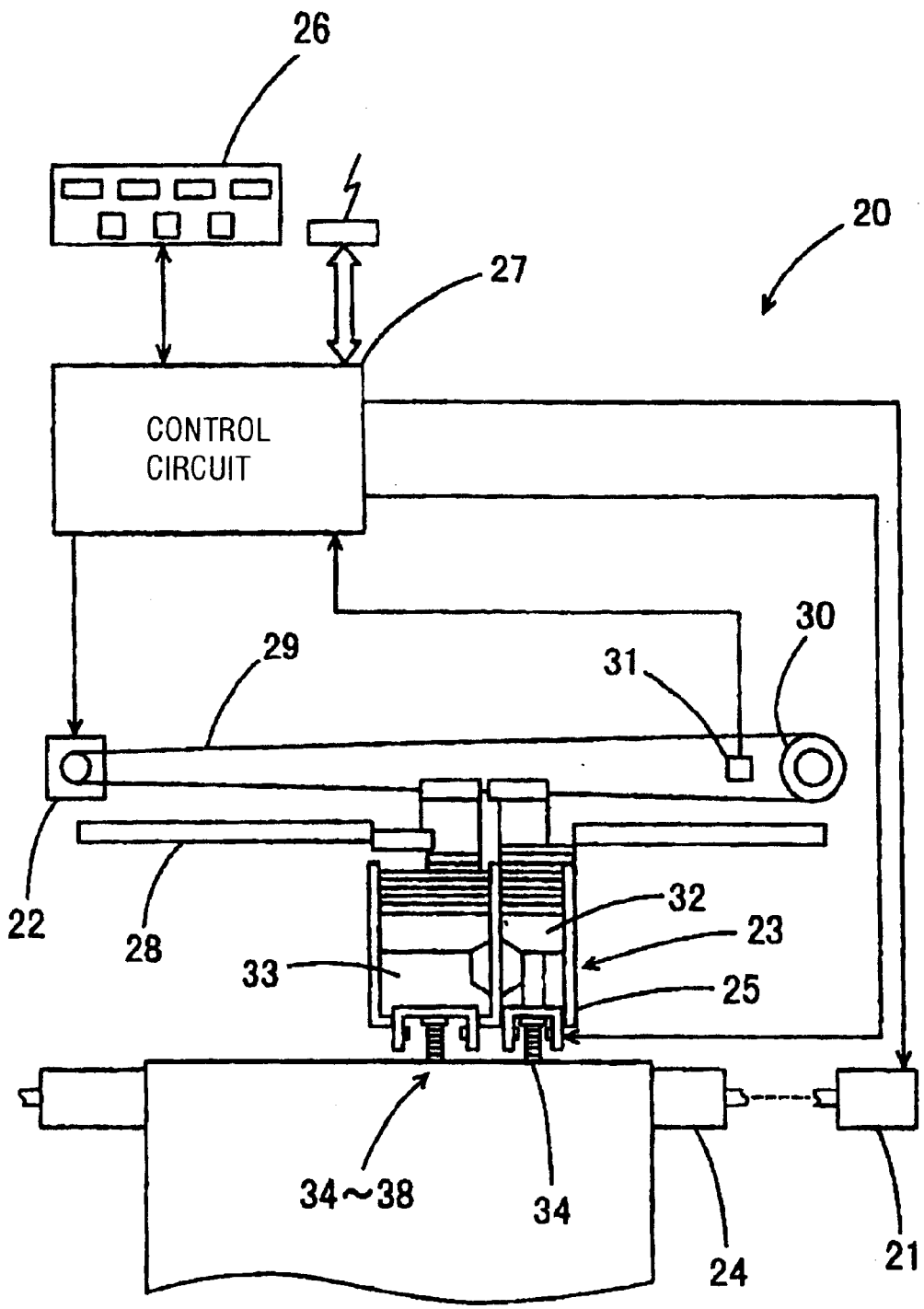
FIG. 6 is a construction diagram showing a schematic construction of a color printer 20.

A schematic construction of the color printer 20 will be described below with reference to FIG. 6.

As shown in the same figure, the color printer 20 is made up of a mechanism for conveying paper P with use of a paper feed motor 21, a mechanism for reciprocating a carriage 23 axially of a platen 24 with use of a carriage motor 22, a mechanism for driving a print head 25 mounted on the carriage 23 to eject ink for forming dots, and a control circuit 27 for controlling the input and output of signals with respect to the paper feed motor 21, carriage motor 22, print head 25, and an operating panel 26.

The mechanism for reciprocating the carriage 23 axially of the platen 24 comprises a slide shaft 28 mounted in parallel with a shaft of the platen 24 to support the carriage 23 slidably, a pulley 30 with an endless drive belt 29 stretched between it and the carriage motor 22, and a position sensor 31 for detecting the position of an origin of the carriage 23.

An ink cartridge 32 for black ink (K) and an ink cartridge 33 containing three color inks—cyan (C), magenta (M), and yellow (Y)—are loaded onto the carriage 23. The print head 25 mounted on a lower portion of the carriage 23 is formed with a total of four ink ejecting heads 35 to 38. When the ink cartridges 32 and 33 are loaded onto the carriage 23 from above, it becomes possible to effect the supply of inks from the ink cartridges 32 and 33 to the ink ejecting heads 34 to 38.

Figure 7:
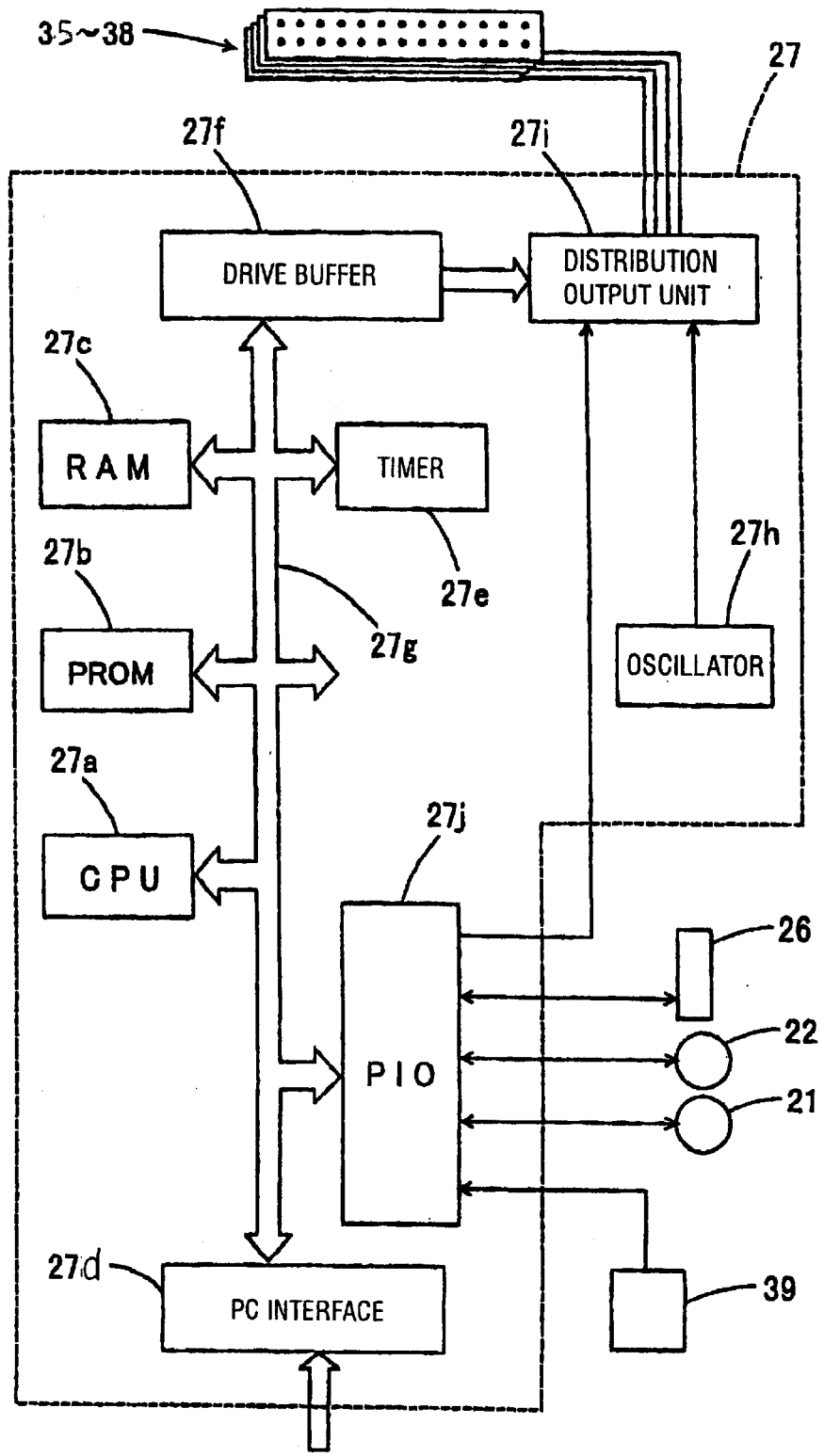
FIG. 7 is a construction diagram showing a schematic construction of the color printer 20.

The following description is now provided about an internal construction of the control circuit 27 in the color printer 20. FIG. 7 illustrates an internal construction of the control circuit 27.

As shown in the same figure, in the interior of the control circuit 27 are disposed a CPU 27a, a ROM 27b, a PC interface 27d for the delivery and receipt of data to and from the computer 10, a peripheral I/O unit 27j for the delivery and receipt of signals to and from the paper feed motor 21, carriage motor 22 and operating panel 26, a timer 27e for counting elapsed time, and a drive buffer 27f which outputs dot on/off signals to the heads 35 to 38.
These devices and circuits are interconnected through a bus 27g. In the control circuit 27 are further provided an oscillator 27h which outputs a driving waveform for driving a piezoelectric element in each nozzle at a predetermined frequency and a distributor 27i which distributes the output from the oscillator 27h to the heads 35 to 38.

In this construction, the control circuit 27 receives printing data processed by the computer 10, stores it in the RAM 27c temporarily and outputs the stored data to the drive buffer 27f at a predetermined timing. Data which indicates on/off of dot for each nozzle is outputted from the drive buffer 27f to the distributor 27i. As a result, a drive waveform for driving the piezoelectric element PE is outputted to a nozzle which should form a dot. In this way a dot is formed.

Although the color printer 20 provided with heads which eject inks using piezoelectric elements is used in this embodiment as mentioned above, there may be used a printer which ejects inks by another method. For example, there may be used a printer of the type in which a heater disposed in an ink passage is charged with an electric current and ink is ejected with bubbles formed within the ink passage. In addition to the type in which a dot is formed by the ejection of ink, there also may be used any of various types of printers, including thermal transfer type, sublimation type, and dot impact type.

(5) Printing Data Generating Process

Figure 8:
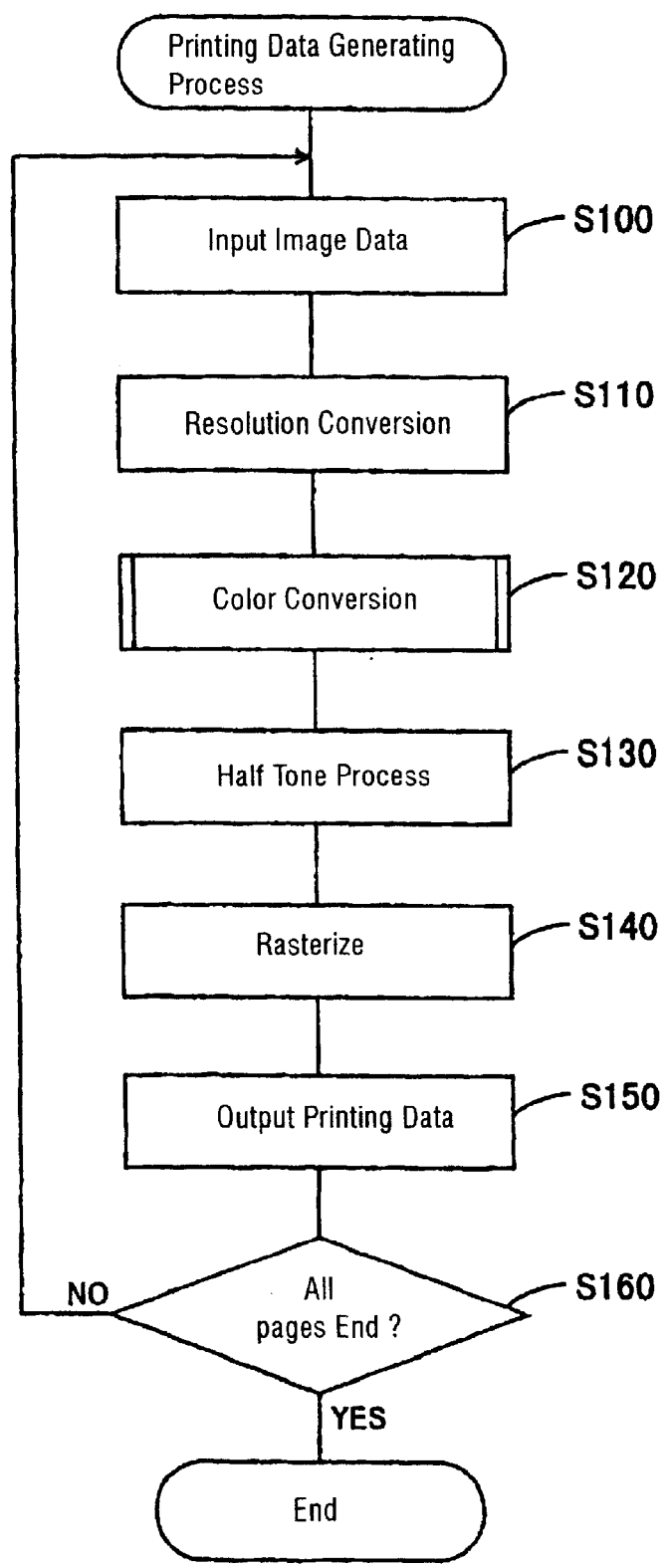
FIG. 8 is a flowchart showing the contents of a printing data generating process.

In carrying out printing with use of the computer 10 and color printer 20, the printer driver 10c as a program for driving the color printer to effect printing is executed. The printer driver 10c is turned ON by a print instruction provided from the application program 10a. FIG. 8 is a flowchart showing the contents of a printing data generating process which is a part of processing carried out by the CPU 11 at the time of executing the printer driver 10c. In the same figure, when the printing data generating process is started, the CPU 11 inputs image data ORG (step S100). The image data ORG is provided from the application program 10a shown in FIG. 5. As noted earlier, the image data ORG has 256 (0 to 255) gray scale values of colors R, G, B for each of picture elements which constitute an image.

The CPU 11 converts the resolution of the inputted image data ORG into a resolution for the execution of printing in the color printer 20 (step S110). In the case where the resolution of the image data ORG is lower than the printing resolution, a resolution conversion is made by linear interpolation to generate new data between adjacent original image data. On the other hand, in the case where the resolution of the image data ORG is higher than the printing resolution, a resolution conversion is made by, for example, a method of thinning out data at a certain ratio. The resolution converting process is not essential in this embodiment. Printing may be done without performing such a process.

Next, the CPU 11 performs a color conversion process in the color conversion module 10c1 (step S120). In this color conversion process, the image data ORG consisting of gradation values of R, G, B is converted to gradation value data of the colors C, M, Y, and K which are used in the color printer 20. The color conversion process is executed by utilizing the color conversion table LUT in which combinations of C, M, Y, K for expressing combined colors of R, G, B in the color printer 20 are preset and stored. As to the processing itself of executing the color conversion with use of the color conversion table LUT, various known techniques are applicable. For example, an interpolation process is applied. Then, the CPU 11 performs a multi-value coding process for the thus color-converted image data ORG in the half tone module 10c2 (step S130).

Subsequently, the CPU 11 carries out a rasterizing process (step S140), in which data for one raster are re-arranged in the order of transfer to the print head in the color printer 20. There are various modes of recording methods for the color printer 20 to form rasters. In the simplest mode, all dots in each raster are formed by one reciprocating motion of the head. In this case, the data for one raster may be outputted in their processed order. Another mode is an overlap mode in which dots of each raster are formed alternately in the first horizontal scan and the remaining dots are formed in the second horizontal scan. Thus, each raster is formed by performing the horizontal scan twice.

In case of adopting such a recording method, it is necessary that data obtained by picking up raster dots alternately be transferred to the head. As another recording mode there may be adopted a two-way recording mode in which dots are formed not only by a going motion of the head but also by a return motion of the head. In case of adopting such a recording mode, there arises the necessity that data for going motion and data for return motion be reversed with respect to the order of transfer. When printing data FNL capable of being printed in the color printer 20 is thus generated, the CPU 1 outputs the printing data FNL to the color printer 20 (step S150). Then, the processings of the above steps S100 to S150 are executed for all pages of the image data ORG (step S160).

In this embodiment, the inks of black (K), cyan (C) magenta (M), and yellow (Y) loaded on the carriage 23 are aqueous pigment inks for use in an ink jet printer. These aqueous pigment inks are water-insoluble and it is necessary for each of them to be prepared in the form of an aqueous dispersion with pigment particles dispersed in water. In this aqueous pigment ink as an aqueous dispersion, pigment particles in the ink dispersion precipitate with the lapse of time, giving rise to a gradient in the concentration of pigment particles in the ink liquid contained in each of the ink cartridges 32 and 33. On the other hand, when ink is to be fed to the exterior from the ink cartridges 32 and 33, the supply of each ink is performed through an ink supply passage formed in a predetermined position. Therefore, if there is a density gradient in the ink cartridges 32 and 33, the density of ink supplied varies correspondingly to the density gradient. That is, there occur variations in the actual print density.

In this embodiment, in view of the point just referred to above, a predetermined table which can recognize the degree of variations in ink density based on such density gradient with time is provided beforehand in the printer driver 10c and is referred to when the printer driver generates the printing data FNL. In this state there is performed a print density correcting process involving correcting the actual print density to keep the print density on the printing medium constant. This print density correction is executed in the color conversion process of step S120 which is carried out by the color conversion module 10c1 described above.

(6) First Embodiment

A description will now given of a first embodiment of the print density correcting process which is executed by the printer driver 10c. In this first embodiment, the image data ORG which is expressed in 256 gray scales of R, G, B in the color conversion module 10c1 is color-converted in accordance with the color conversion table LUT to generate image data expressed in terms of 256 gray scales of C, M, Y, K. In this case, as a processing performed prior to this color conversion, the color conversion table LUT is modified correspondingly to variations in ink density. And there is adopted a mode in which by making color conversion with use of the thus-modified color conversion table there are performed both color conversion and print density correction at a time.

In this first embodiment, information on the amount of ink used is utilized as identification information able to identify variations in ink density. As noted above, variations in ink density change with the lapse of time and the amount of ink used increases gradually as ink is used in printing. By detecting a change in the amount of ink used it is possible to recognize a change with time in ink density indirectly. Thus, information on the amount of ink used can be utilized as identification information.

Figure 9:
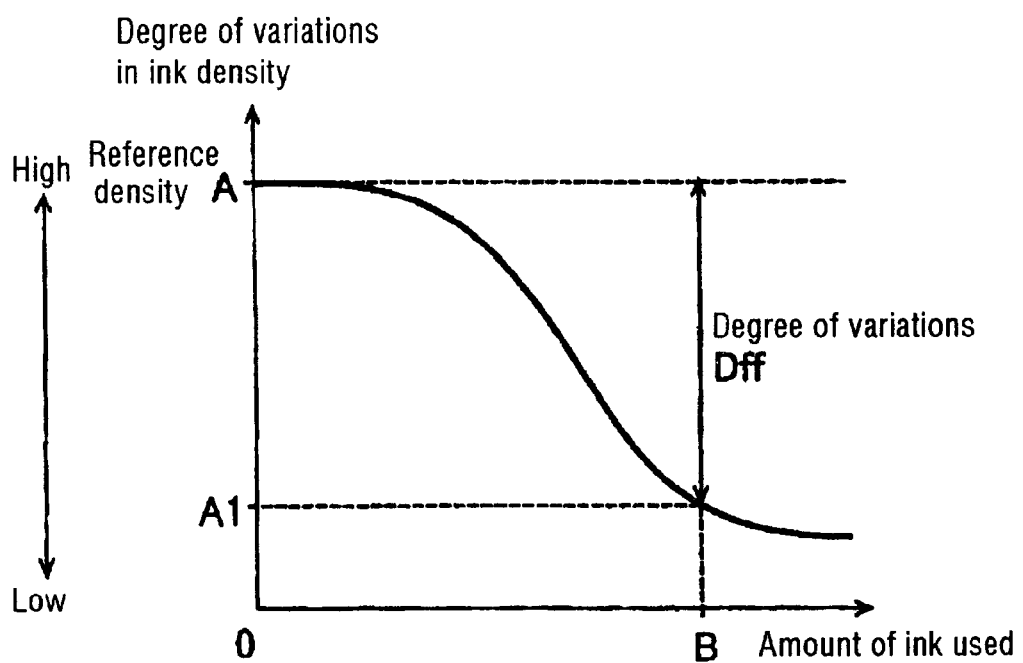
FIG. 9 is a diagram showing the degree of variations in ink density corresponding to changes with time in ink density.
Figure 10:
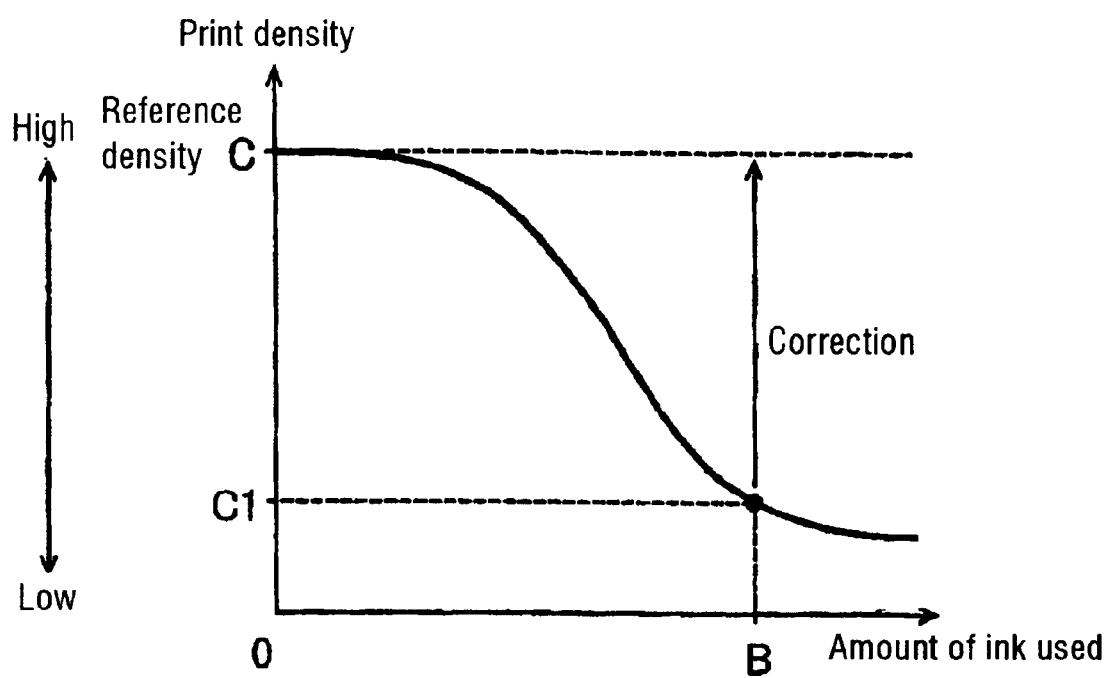
FIG. 10 is a diagram showing the degree of variations in print density.

FIG. 9 illustrates the degree of variations in ink density based on changes with time and FIG. 10 illustrates the degree of variations in print density which occur correspondingly to the degree of variations in ink density.

In FIG. 9, the amount of ink used is plotted along the axis of abscissa, while the degree of variations in ink density based on density gradient is plotted along the axis of ordinate. In FIG. 10, the amount of ink used is read along the axis of abscissa, while the degree of variations in print density is read along the axis of ordinate. As the amount of ink used increases from a reference density A, the degree of variations in ink density changes gradually in a thinning direction, then changes largely in the thinning direction at a predetermined amount of ink used, and thereafter becomes thinner gradually. Such a mode of variations is shown. As to the degree of variations in print density, it changes correspondingly to the change in the degree of variations in ink density. In the case where the print density is α gray scale, the reference density A indicates the density of ink corresponding to the print density of α gray scale at which printing is performed under an ordinary ink ejection On the other hand, as the amount of ink used increases, the density of ink becomes lower to the extent that the print density to be attained is not realized even under an ordinary ink ejection. In more particular terms, when the amount of ink used is B in FIG. 9, there is ejected ink of ink density A1 although ink of the reference density A should be ejected. It follows that ink having a degree of variations in ink density of Dff with respect to the reference value A is ejected. On the other hand, printing is done at a print density of a gray scale which is expressed in terms of an appropriate reference density C corresponding to the reference ink density A. However, the ink density varies gradually as ink is used as noted above. Therefore, when the amount of ink used is B, printing is performed not at the required reference print density C, but at a lower print density C1. In this case, the amount of dots ejected is increased by the print density correcting process to correct the print density C1 into the reference density C.

The degree of variations in ink density caused by an increase in the amount of ink used described above can be grasped qualitatively beforehand on the basis of ink properties. Consequently, the degree of variations in print density based on the degree of variations in ink density can also be grasped qualitatively in advance. Thus, once the amount of ink used is known, the degree of variations in ink density is estimated and so is the degree of variations in print density therefrom. If the degree of variations in print density is estimated, it is seen how the print density is to be corrected.

The correction is made by multiplying an ordinary amount of dots ejected by a predetermined correction coefficient in an increasing direction of the amount of dots ejected so that the print density becomes higher. Thus, the aforesaid estimation permits a correction coefficient corresponding to degree of variations in ink density to be determined in advance. In this embodiment, a predetermined correction coefficient table wherein amounts of ink used, degrees of variations in ink density, and correction coefficients are correlated with one another is provided in the printer driver 10c. In generating printing data FNL, the printer driver 10c makes reference to the correction coefficient table as necessary and modifies the color conversion table LUT so that the correction of print density is made simultaneously with color conversion.

Figure 11:
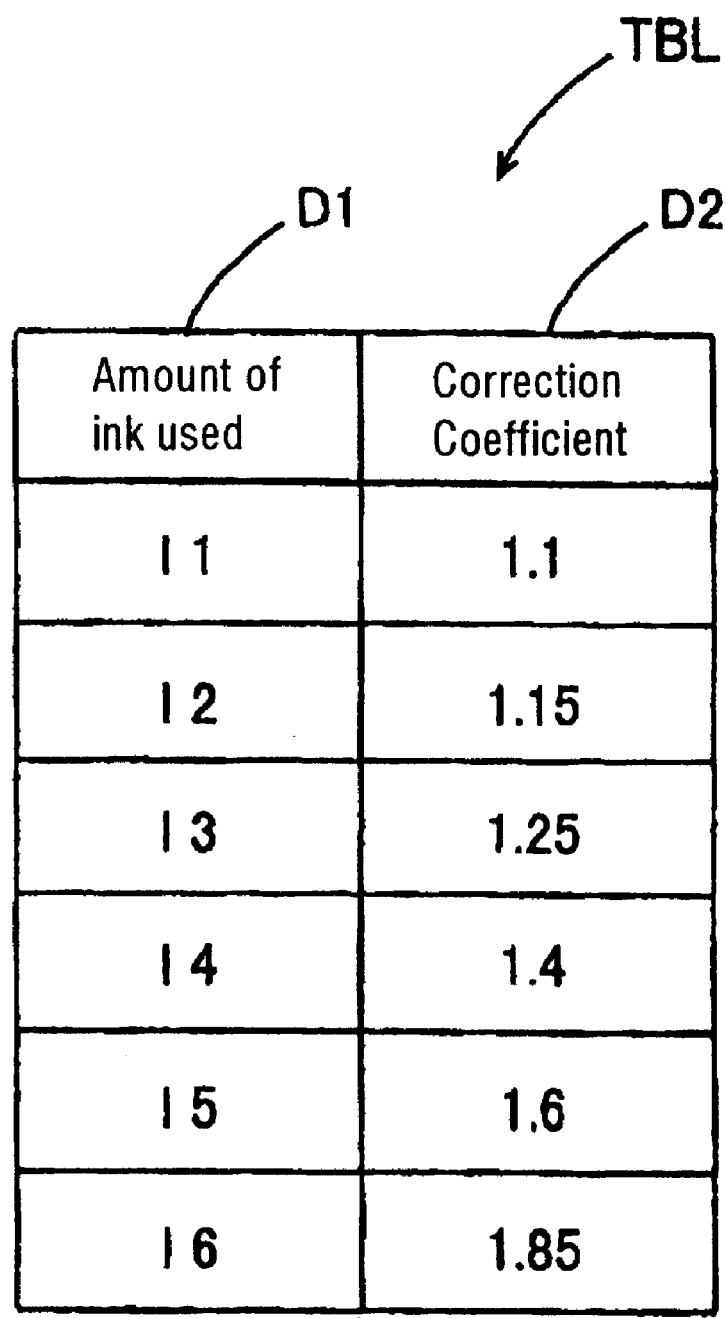
FIG. 11 is a construction diagram showing the construction of a correction coefficient table.

FIG. 11 illustrates the construction of the correction coefficient table provided in the printer driver 10c. In the same figure, the correction coefficient table TBL is composed of amounts of ink used, D1, and correction coefficients, D2. This table shows that in this embodiment the correction coefficient is 1.1 when the amount of ink used is I1. Therefore, when a detected amount of ink used is I1, ink is ejected in an amount of E*1.1 to correct the print density in which E is an ordinary amount of ink to be ejected.

Figure 12:
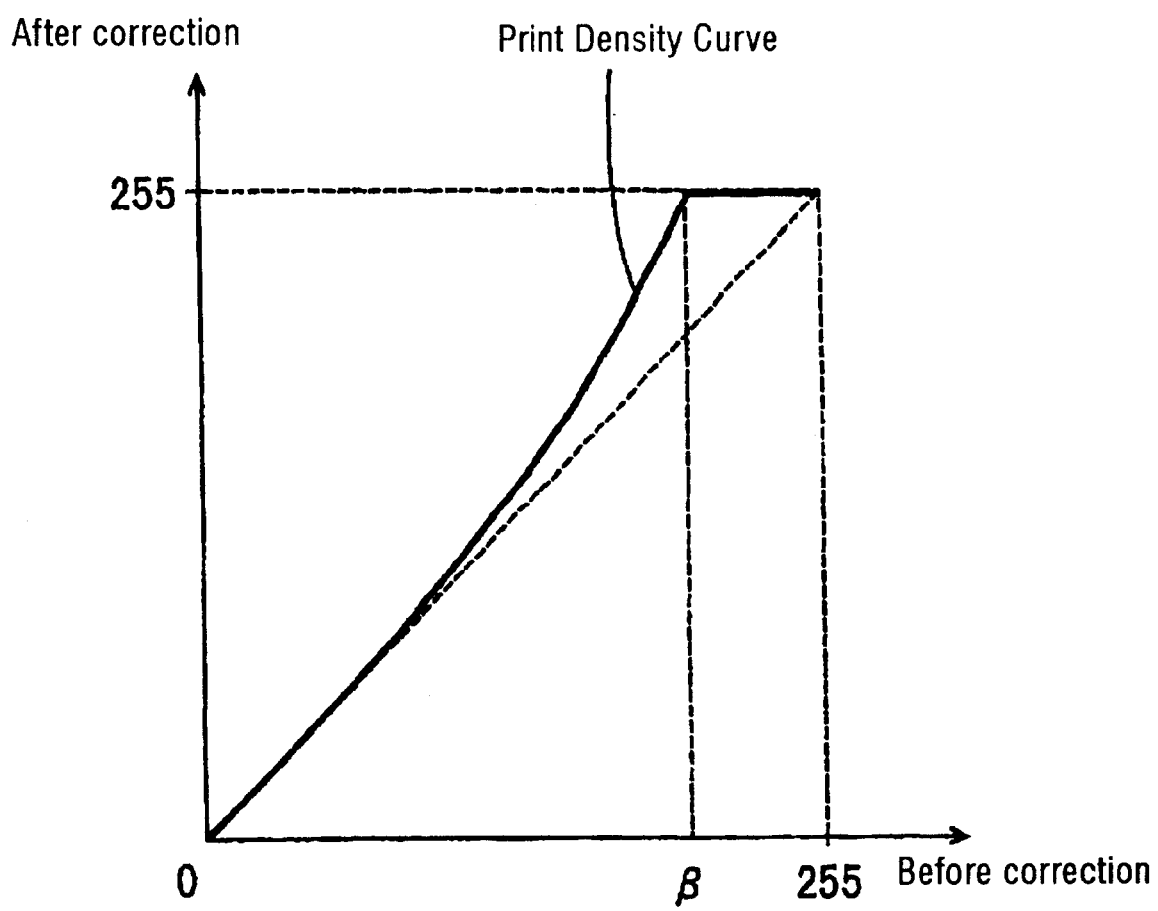
FIG. 12 is a diagram showing a relation between gradations before and after correction.

From the same table it is seen that the correction coefficients are 1.15, 1.25, 1.4, 1.6, and 1.85 when the amounts of ink used are I2, I3, I4, I5, and I6, respectively. As the case may be, the multiplication of such a correction coefficient results in the print density becoming 256 or more in gradation. FIG. 12 shows a measure to be taken against this case. In the same figure, a solid curve is a print density correction curve indicating print densities after the multiplication of correction coefficients. At β gray scale or more before correction at which the print density correction curve exceeds 256 in gradation, the correction coefficient is allowed to reach the ceiling so that the gray scale after correction does not exceed 256.

Figure 13:
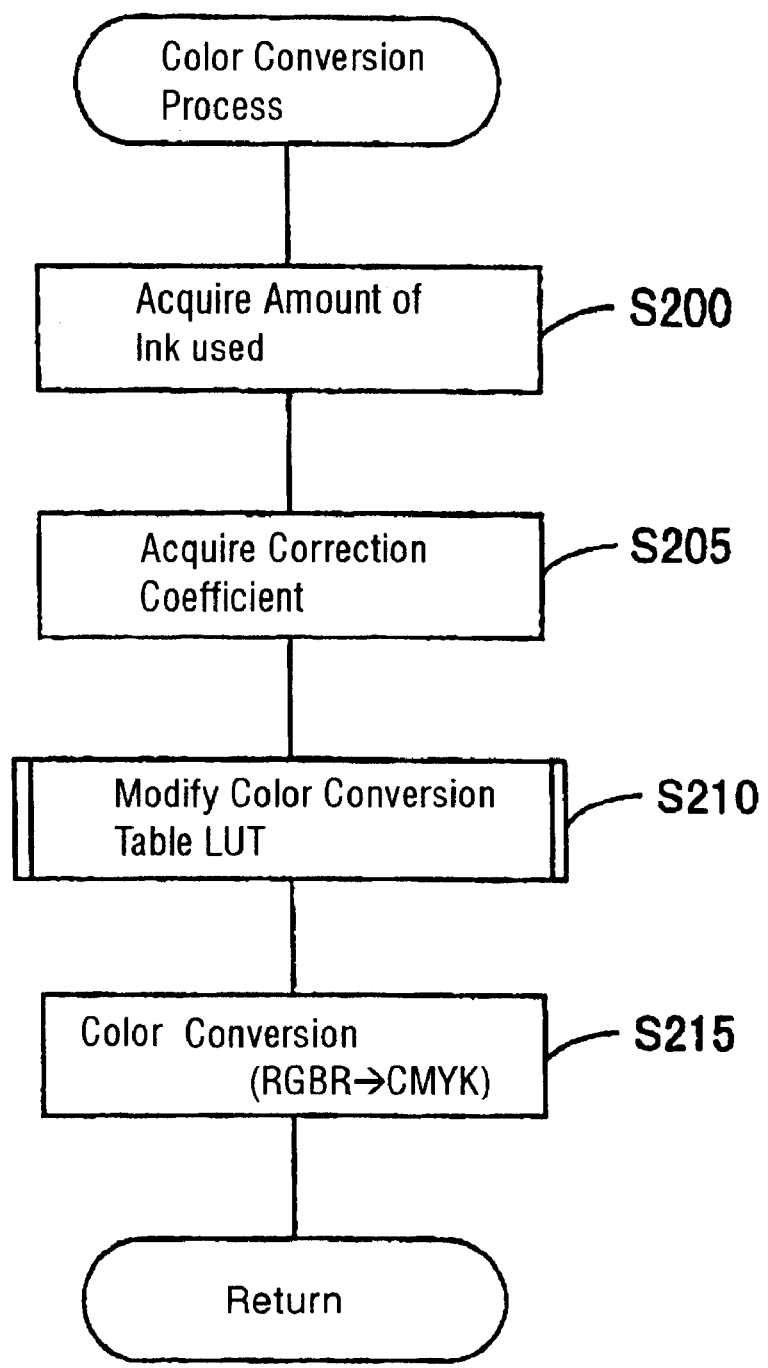
FIG. 13 is a flowchart showing the contents of a color conversion process in a first embodiment of the present invention.

FIG. 13 is a flowchart showing the contents of a color conversion processing executed in step S120 by the color conversion module 10c1 which involves a print density correcting process. In the same figure, first an amount of ink used is acquired from the printer 20 (step S200), Then, the correction coefficient table TBL is retrieved on the basis of the amount of ink used to acquire the corresponding correction coefficient (step S205). Next, the color conversion table LUT is modified on the basis of the correction coefficient (step S210) and there is made color conversion from 256 gray scales of R, G, B into 256 gray scales of C, M, Y, K with respect to image data ORG (step S215). As a result, the data after the conversion to C, M, Y, K involves a corrected print density.

In this first embodiment there is adopted a construction in which one correction coefficient table TBL is used in common to the colors used and the color conversion table LUT is modified with the same correction coefficient at the time of conversion to C, M, Y, K. But, as a matter of course, there may be adopted a construction in which the correction coefficient table TBL is established for each of C, M, Y, K colors and the color conversion table LUT is modified for each individual case.

In this first embodiment no special limitation is placed on the timing at which the color conversion table LUT is to be modified. The same table may be modified when printing is started or at every generation timing of printing data for each band width. If the color conversion table LUT is modified at the start of printing, an overhead at the initial modification becomes large, with consequent increase of processing load and processing time, but thereafter printing is performed on the basis of the modified color conversion table LUT and therefore it is possible to effect the ordinary printing. On the other hand, in the case where the conversion table LUT is modified for each band width, an overhead associated with the modification for each band width causes an increase of processing load and time, but it becomes possible to correct the print density for each band width.

Thus, the modification of the color conversion table LUT in the first embodiment involves increased processing load and processing time. As to the color conversion table LUT for converting 256 gray scales of R, G, B to 256 gray scales of C, M, Y, K, there are 16777216 conversion combinations. Further, it is necessary to multiply C, M, Y, and K by a correction coefficient and in this case there arises the necessity of performing 4*16777216 arithmetic operations. However, once the modification is made, it becomes possible to effect a high-speed printing with use of the color conversion table LUT.

On the other hand, from the standpoint of correcting the print density, no special limitation is made to the mode in which the print density is corrected simultaneously with modification and color conversion of the color conversion table LUT. For example, there may be adopted another method in which the gradation for each picture element is modified with a correction coefficient to correct the print density after conversion from 256 gray scales of R, G, B to 256 gray scales of C, M, Y, K in accordance with the color conversion table LUT. Next, this method involving modifying the gradation for each picture element to correct the print density will be described below as the second embodiment.

(7) Second Embodiment

Figure 14:
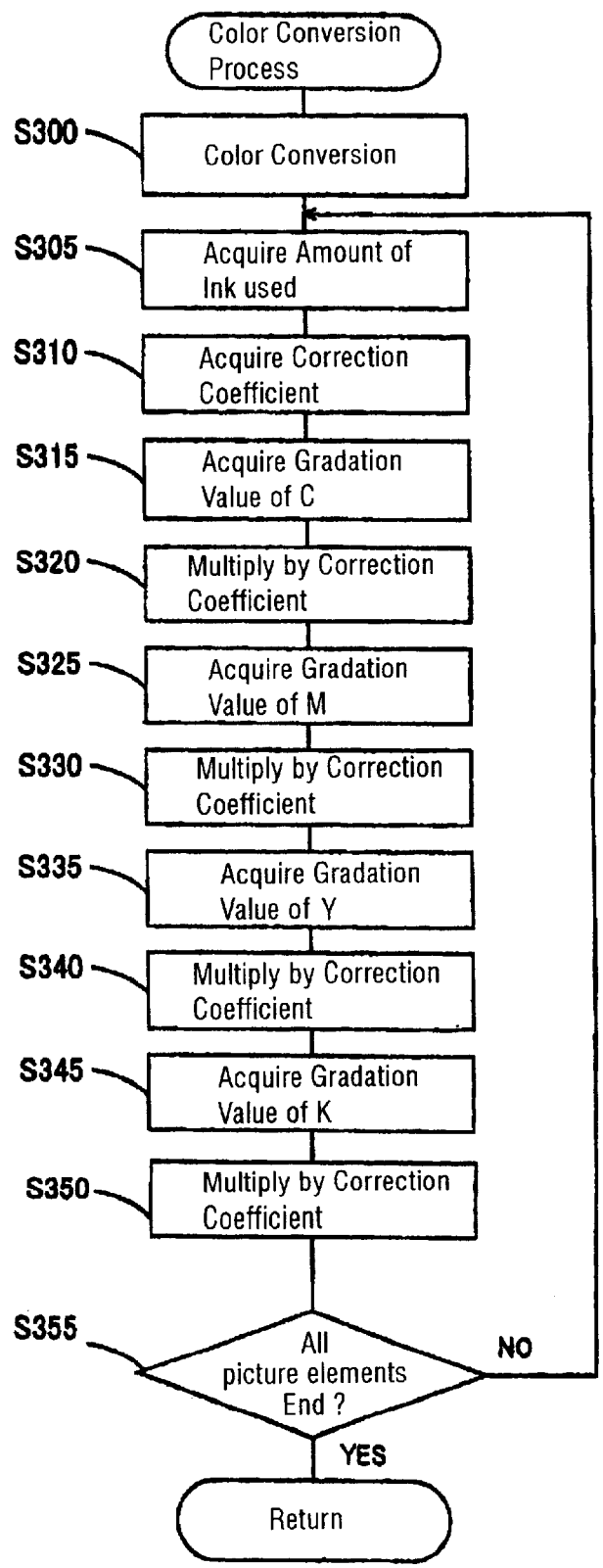
FIG. 14 is a flowchart showing the contents of a color conversion process in a second embodiment of the present invention.

As in the previous first embodiment, a print density correcting process in this second embodiment is carried out by the color conversion processing of step S120 which is executed by the color conversion module 10c1. FIG. 14 is a flowchart showing the contents of the color conversion processing which involves the print density correcting process in the second embodiment. In the same figure, first there is made a color conversion from 256 gray scales of R, G, B to 256 gray scales of C, M, Y, K with respect to image data ORG (step S300). An amount of ink used is acquired from the color printer 20 (step S305). Then, on the basis of the thus-acquired amount of ink used, the correction coefficient table TBL is retrieved to obtain the corresponding correction coefficient (step S310). Next, there is obtained a gradation value of cyan (C) after the color conversion in step S300 (step S315) and the gradation value is multiplied by the correction coefficient to obtain a gradation value of cyan (C) corrected in print density (step S320).

Likewise, a gradation value of magenta (M) after the color conversion in step S300 is acquired (step S325) and is multiplied by the correction coefficient to obtain a gradation value of magenta (M) corrected in print density (step S330). A gradation value of yellow (Y) after the color conversion in step S300 is obtained (step S335) and is multiplied by the correction coefficient to obtain a gradation value of yellow (Y) corrected in print density (step S340). Further, a gradation value of black (K) after the color conversion in step S300 is obtained (step S345) and is multiplied by the correction coefficient to obtain a gradation value of black (K) corrected in print density (step S350). The processings of the above steps S305 to S350 are executed for all the picture elements of the image data after the color conversion (step S355).

(8) Modified Example of Identification Information

In the above first and second embodiments, an amount of ink used is acquired from the color printer 20 as identification information able to identify the degree of variations in ink density, then on the basis of the amount of ink used thus acquired a correction coefficient is obtained from the correction coefficient table TBL to modify the color conversion table LUT and correct the gradation of each picture element in image data after color conversion, thereby correcting the print density. On the other hand, the identification information able to identify the degree of variations in ink density, which is a change in density gradient occurring with the lapse of time within the ink cartridges 32 and 33, is not limited to the amount of ink used.

For example, the manufacturing year, month and date of ink may be read from an IC chip which stores, for example, a manufacturing serial number affixed to each of the ink cartridges 32 and 33 and be used as identification information for identifying the degree of variations in ink density. Alternatively, the date and time of replacement of the ink cartridges 3 and 33 may be managed by the printer driver 10c and this ink replacement information may be used as identification information for identify the degree of variations in ink density. In this case, there may be adopted a construction wherein ink manufacturing information and correction coefficients, or ink replacement information and correction coefficients, are stored correlatively in the correction coefficient table TBL, then ink manufacturing information or ink replacement information is acquired in step S200 or S305 in the foregoing color conversion processing, and a correction coefficient corresponding to the acquired ink manufacturing information or ink replacement information is acquired from the correction coefficient table TBL.

(9) Thin Color

In the above first and second embodiments a description has been given about a method in which the color conversion table LUT for the conversion of image data ORG of R, G, B to C, M, Y, K is modified on the basis of a correction coefficient to correct the print density and also about a method in which the gradation of each of C, M, Y, K after color conversion is modified on the basis of a correction coefficient to correct the print density. Of the four colors C, M, Y, and K, yellow (Y) is a thin color, so when there occur variations in print density due to certain variations in ink density and when a human sees a printed matter obtained without correcting the print density, it is difficult for the human's visual range to grasp such variations in print density. Yellow (Y) is thinner than the other cyan (C), magenta (M), and black (K) colors.

Thus, the variations in print density are not conspicuous even in comparison with the other colors. For this reason, as to yellow (Y), variations in ink density are connived and correction of the print density is not performed. As a result, the quantity of arithmetic operation can be reduced to 3*16777216 of C, M, and K by modification of the color conversion table LUT in step S210 in the color conversion processing of the first embodiment, thus permitting the attainment of a high-speed processing. Besides, it becomes possible to omit steps S355 and S340 in connection with yellow (Y) for all the picture elements in the color conversion processing of the second embodiment, thus also permitting the attainment of a high-speed processing.

Although the color printer used in the first and second embodiments is the color printer 20 which utilizes the four colors C, M, Y, and K, there maybe adopted a color printer which utilizes six colors—C, M, Y, K, plus light cyan (Lc) and light magenta (Lm)—. In this case, if the correction of print density is made on neither yellow (Y) nor light cyan (Lc) and light magenta (Lm), it becomes possible to attain a still higher processing speed.

(10) Pigment

The inks used in the first and second embodiments are aqueous pigments, which are insoluble in water. In a pigment ink as an aqueous dispersion, as noted earlier, pigment particles in the aqueous dispersion precipitate, giving rise to a gradient in the density of pigment particles in the dispersion, with consequent occurrence of variations in ink density with the ink cartridges 32 and 33. The degree of variations in ink density differs for each ink color. Therefore, as to an ink easy to cause a large degree of variations in ink density, correction of the print density may be performed, while as to an ink difficult to cause variations in ink density and with the degree of the variations being small even upon occurrence thereof, correction of the print density may be omitted.

That is, in a printed matter using the four colors C, M, Y, and K, a color relatively small in the degree of variations in ink density causes less conspicuous variations in print density in comparison with the other colors. Therefore, for such an ink color relatively small in the degree of variations in ink density, variations in print density based on variations in ink density are connived and correction of the print density is not performed. By thus omitting the correction of print density for a color small in the degree of variations in ink density it is made possible to attain a high-speed processing as is the case with a thin color referred to above.

Thus, in the color conversion processing which the color conversion module 10c1 executes in the print data generating process executed by the printer driver 10c, an amount of ink used is acquired with respect to an ink contained in the ink cartridge 32 or 33 and a degree of variations in ink density is acquired on the basis of the thus-acquired amount of ink used. Then, on the basis of the thus-acquired degree of variations in ink density the correction coefficient table TBL is retrieved to acquire a correction coefficient for the print density. Further, on the basis of the correction coefficient thus acquired the color conversion table LUT is modified or a gradation value after color conversion with the color conversion table LUT is modified to correct the print density. In this way variations in print density caused by variations in ink density which occur with the lapse of time are prevented, thus making it possible to effect printing at a constant print density.

We claim:

1. A medium with a print density correcting program stored thereon, the print density correcting program being adapted to operate on a computer to correct variations in print density in a printer based on variations in ink density which correspond to changes with time in ink density, the printer ejecting ink onto a printing medium to effect printing, the print density correcting program causing the computer to execute the following functions:

an identification information acquiring function of acquiring identification information able to identify the degree of variations in ink density directly or indirectly; and a print density correcting function comprising acquiring a correction coefficient and correcting the print density so as to eliminate the variations in print density in accordance with the correction coefficient acquired, the correction coefficient being for correcting the variations in print density which correspond to changes with time in ink density in accordance with the identification information acquired.

2. A medium according to claim 1, wherein information on the amount of ink used is acquired as the identification information in the identification information acquiring function, while in the print density correcting function there is acquired a correction coefficient based on a correlation between the information on the amount of ink used and information on changes in print density.

3. A medium according to claim 1, wherein information on the manufacture of ink is acquired as the identification information in the identification information acquiring function, while in the print density correcting function there is acquired a correction coefficient based on a correlation between an elapsed time from the manufacture of ink based on the information on the manufacture of ink and information on changes in print density.

4. A medium according to claim 1, wherein information on the amount of ink used and information on the manufacture of ink are acquired as the identification information in the identification information acquiring function, while in the print density correcting function there is acquired a correction coefficient which reflects information on changes in ink density based on both the information on the amount of ink used and the information on the manufacture of ink.

5. A medium according to claim 1, wherein information on the replacement of ink is acquired as the identification information in the identification information acquiring function, while in the print density correcting function there is acquired a correction coefficient based on a correlation between changes with time in ink density based on the information on the replacement of ink and changes in print density.

6. A medium according to claim 1, wherein in the print density correcting function the print density is corrected in the course of conversion to color data of a color space different from color data of a predetermined color space in print control.

7. A medium according to claim 6, wherein in the print density correcting function data in a color conversion table which is referred to in the course of the conversion to color data are rewritten to correct the print density.

8. A medium according to claim 6, wherein in the print density correcting function the color data after the color space conversion is converted to correct the print density.

9. A medium according to claim 1, wherein in the identification information acquiring function the identification information is acquired every time a predetermined area of an image is printed, while in the print density correcting function the correction coefficient is newly acquired upon acquisition of the identification information and the print density is corrected on the basis of the correction coefficient acquired.

10. A medium according to claim 9, wherein in the identification information acquiring function the identification information is acquired for each printing band width, while in the print density correcting function the correction coefficient is acquired upon acquisition of the identification information to correct the print density for each band width.

11. A medium according to claim 9, wherein in the identification information acquiring function the identification information is acquired for each picture element to be printed, while in the print density correcting function the correction coefficient is acquired upon acquisition of the identification information to correct the print density for each picture element.

12. A medium according to claim 1, wherein in the print density correcting function the correction of print density is not performed with respect to a predetermined element color.

13. A medium according to claim 12, wherein in the print density correcting function the correction of print density is not performed with respect to yellow color.

14. A medium according to claim 12, wherein in the print density correcting function the correction of print density is not performed with respect to a relatively thin element color out of plural element colors.

15. A medium according to claim 12, wherein in the print density correcting function the correction of print density is not performed with respect to an element color of relatively small variations in ink density.

16. A medium according to claim 1, wherein the ink is an aqueous pigment ink.

17. A medium with a print density correcting program stored thereon, the program being adapted to operate on a computer to correct variations in print density in a printer based on variations in ink density which correspond to changes with time in ink density, the computer capable of being connected to the printer which makes printing by ejecting ink onto a printing medium and being provided with an interface which can transmit data, the print density correcting program causing the computer to execute the following functions:
an identification information acquiring function of acquiring identification information able to identify the degree of variations in ink density directly or indirectly; and
a print density correcting function comprising acquiring a correction coefficient and correcting the print density so as to eliminate the variations in print density in accordance with the correction coefficient acquired, the correction coefficient being for correcting the variations in print density which correspond to changes with time in ink density in accordance with the identification information acquired.

18. A print density correcting apparatus for correcting variations in print density in a printer based on variations in ink density which correspond to changes with time in ink density, the printer ejecting ink onto a printing medium to effect printing, the apparatus comprising:
an identification information acquiring means for acquiring identification information able to identify the degree of variations in ink density directly or indirectly; and
a print density correcting means which, on the basis of the identification information acquired, acquires a correction coefficient for correcting the variations in print density corresponding to changes with time in ink density and which, on the basis of the correction coefficient acquired, corrects the print density so as to eliminate the variations in print density.

19. A print density correcting method for correcting variations in print density in a printer based on variations in ink density which correspond to changes with time in ink density, the printer ejecting ink onto a printing medium to effect printing, the method comprising the steps of:
acquiring identification information able to identify the degree of variations in ink density directly or indirectly; and
acquiring, on the basis of the identification information acquired, a correction coefficient for correcting variations in print density corresponding to changes with time in ink density and, on the basis of the correction coefficient acquired, correcting the print density so as to eliminate the variations in print density.

20. A medium with a print control program stored thereon, the print control program being adapted to operate on a computer to input image data of a color space different from a color space of printing data capable of being printed in a printer, convert the image data into printing data capable of being printed by the printer and output the printing data, the computer capable of being connected to the printer which ejects ink onto a printing medium to effect printing and being provided with an interface able to transmit data, the print control program causing the computer to execute the following functions:
a conversion function of converting the image data to the printing data;
an identification information acquiring function of acquiring identification information able to identify the degree of variations in ink density directly or indirectly for correcting variations in print density based on variations in ink density which correspond to changes with time in ink density; and
a print density correcting function comprising acquiring a correction coefficient for correcting the variations in ink density corresponding to changes with time in ink density on the basis of the identification information acquired, correcting the print density so as to eliminate the variations in print density on the basis of the correction coefficient acquired, and reflecting the corrected print density in the printing data.

21. A printing data which is binarized and in which variations in print density in a printer based on variations in ink density corresponding to changes with time in ink density are corrected so as to be eliminated with use of a correction coefficient based on identification information able to identify the degree of variations in ink density directly or indirectly, the printer ejecting ink onto a printing medium to effect printing.

22. A medium with a print density correcting program stored thereon, the print density correcting program being adapted to operate on a computer to correct variations in print density based on variations in ink density in a printer which ejects ink onto a printing medium to effect printing, the print density correcting program causing the computer to execute the following functions:
an identification information acquiring function of acquiring identification information able to identify the degree of variations in ink density; and
a print density correcting function of correcting the variations in print density on the basis of the identification information acquired.

23. A print density correcting apparatus for correcting variations in print density based on variations in ink density in a printer which ejects ink onto a printing medium to effect printing, the apparatus comprising:
an identification information acquiring means for acquiring identification information able to identify the degree of variations in ink density; and
a print density correcting means for correcting the variations in print density on the basis of the identification information acquired.

24. A print density correcting method for correcting variations in print density based on variations in ink density in a printer which ejects ink onto a printing medium to effect printing, the method comprising:
an identification information acquiring step of acquiring identification information able to identify the degree of variations in ink density; and
a print density correcting step of correcting the variations in print density on the basis of the identification information acquired.

* * * * *